United States Patent
Zhang et al.

(10) Patent No.: US 12,161,939 B2
(45) Date of Patent: Dec. 10, 2024

(54) PLAYER PROFILE MANAGEMENT SYSTEM

(71) Applicant: Electronic Arts Inc., Redwood City, CA (US)

(72) Inventors: Zhaosheng Zhang, Sunnyvale, CA (US); Sijia Huang, Santa Clara, CA (US); Li Li, Sunnyvale, CA (US); Biao Zhou, San Jose, CA (US); Shanzhong Zhu, Fremont, CA (US)

(73) Assignee: Electronic Arts Inc., Redwood City, CA (US)

( * ) Notice: Subject to any disclaimer, the term of this patent is extended or adjusted under 35 U.S.C. 154(b) by 0 days.

(21) Appl. No.: 18/128,300

(22) Filed: Mar. 30, 2023

(65) Prior Publication Data

US 2023/0233946 A1    Jul. 27, 2023

Related U.S. Application Data

(63) Continuation of application No. 17/303,056, filed on May 19, 2021, now Pat. No. 11,660,543.

(51) Int. Cl.
*A63F 13/79* (2014.01)
*A63F 13/355* (2014.01)

(52) U.S. Cl.
CPC ............ *A63F 13/79* (2014.09); *A63F 13/355* (2014.09); *A63F 2300/5533* (2013.01)

(58) Field of Classification Search
None
See application file for complete search history.

(56) References Cited

U.S. PATENT DOCUMENTS

| | | | | |
|---|---|---|---|---|
| 2009/0276718 | A1* | 11/2009 | Dawson | A63F 13/30 |
| | | | | 707/999.009 |
| 2013/0252738 | A1* | 9/2013 | Bortnik | A63F 13/12 |
| | | | | 463/42 |
| 2015/0375101 | A1* | 12/2015 | George | A63F 13/497 |
| | | | | 463/24 |
| 2017/0339089 | A1* | 11/2017 | Longdale | G06F 40/134 |
| 2022/0370921 | A1 | 11/2022 | Zhang | |

OTHER PUBLICATIONS

Office Action for U.S. Appl. No. 17/303,056, mailed on Sep. 23, 2022, Zhang, "Player Profile Management System", 11 Pages.

* cited by examiner

*Primary Examiner* — Jason T Yen
(74) *Attorney, Agent, or Firm* — Lee & Hayes, P.C.

(57) ABSTRACT

A player profile management system collects player data from various systems and generates and manages player profiles. A snapshot pipeline of the player profile management system generates a snapshot player profile associated with a player. The player profile management system receives, after generating the snapshot player profile associated with the player, player data associated with the player. An update pipeline of the player profile management system generates, based on the snapshot player profile and the player data associated with the player, an update player profile associated with the player.

20 Claims, 4 Drawing Sheets

PLAYER PROFILE MANAGEMENT SYSTEM

CROSS-REFERENCE TO RELATED APPLICATION(S)

This application is a continuation of and claims priority to U.S. application Ser. No. 17/303,056, filed on May 19, 2021 and entitled "PLAYER PROFILE MANAGEMENT SYSTEM," the entirety of which is incorporated herein by reference.

BACKGROUND

Computer gaming allows for players to play a variety of electronic and/or video games singularly or with each other via network connectivity, such as via the Internet. Computer gaming may be enabled by gaming system(s) where each of the players may connect using their respective client devices. Gaming and related systems may utilize historical data relating to players to provide services to the players.

BRIEF DESCRIPTION OF THE DRAWINGS

The detailed description is described with reference to the accompanying figures. In the figures, the left-most digit(s) of a reference number identifies the figure in which the reference number first appears. The same reference numbers in different figures indicate similar or identical items.

DETAILED DESCRIPTION

Figure 1:
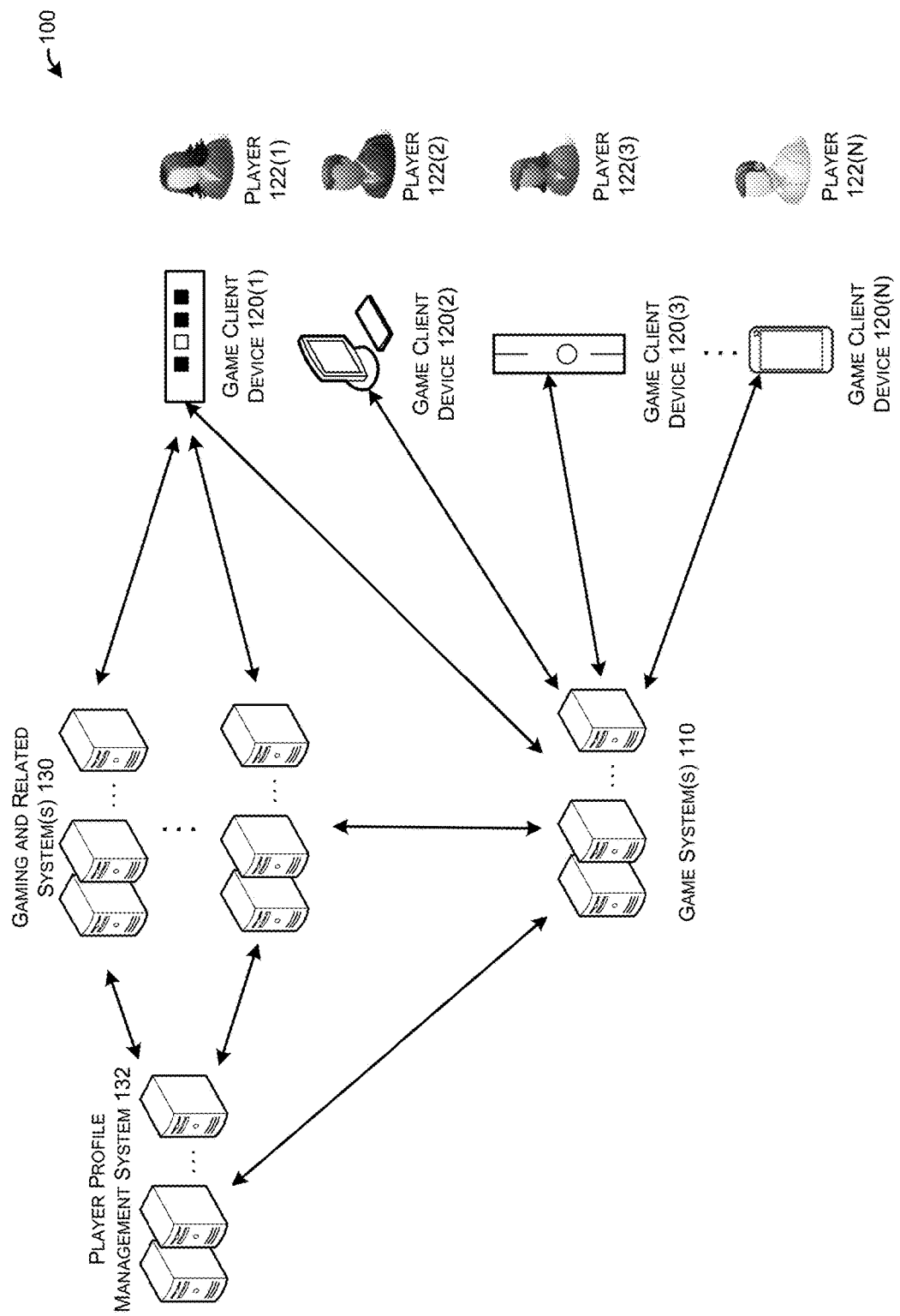
FIG. 1 illustrates a schematic diagram of an example environment with game system(s), game client device(s) and gaming and related system(s) that enable computer gaming and related services and a player profile management system that may collect player data from various systems and generate and manage player profiles, in accordance with example embodiments of the disclosure.

Example embodiments of this disclosure describe methods, apparatuses, computer-readable media, and system(s) for managing player profiles for user(s) of a gaming system. More particularly, some examples herein may provide low latency updates to player profiles based on player data collected from multiple sources without excessive overhead. Some examples may include a player profile management system that may provide player profiles to multiple player profile consumers. Such player profile consumers may include online services and/or batch analyses, such as targeting, recommendation, and player experience personalization services.

The player profile management system may continuously monitor and extract player data including a variety of player attributes from a variety of data sources. The player profile management system may merge player attributes across the data sources to construct a player profile.

In some examples, the player profile management system may include at least two pipelines which may operate in parallel and may output up-to-date player profiles at different frequencies. A pipeline may include a set of data processing components connected in series, where the output of one component may be the input of a next component, though output may not be limited herein to a single next component in some examples. The components of a pipeline may be executed in parallel or in time-sliced fashion. Further, some amount of buffer storage may be inserted between components.

In some examples, the player profile management system may include a snapshot pipeline operating at a first frequency and an update pipeline operating at a second, relatively higher, frequency (e.g., with respect to the frequency of the snapshot pipeline). The snapshot pipeline may construct player profiles based on a full dataset of player attributes on each iteration of the snapshot pipeline. For example, a snapshot player profile for a player may be constructed based on data collected for the player during multiple prior iterations of the snapshot pipeline (e.g., where data has actually been collected for the player in multiple prior iterations of the snapshot pipeline). Some examples utilize all player attributes previously collected for a player when generating a snapshot player profile. On the other hand, the update pipeline may generate update player profiles by merging the most recent snapshot player profile for the player with additional player attributes collected after the creation of the most recent snapshot player profile. For example, the update pipeline may collect data since the latest snapshot profiles were created and combine the collected data with other attributes from the latest snapshot player profiles to output up-to-date update player profiles (e.g., for players for which additional data has been received since the last iteration of the snapshot pipeline).

Building player profiles from data collected across multiple sources and/or utilizing at least two player profile pipelines to create player profiles may provide up-to-date player profiles with low latency, more robust results, and reduced overhead. For example, the collection and merger of player data across multiple sources can provide more complete data from which player profile consumers may operate. In some examples, utilizing at least two player profile pipelines to create player profiles reduces the latency at which up-to-date data is delivered to player profile consumers while maintaining efficiency. In some examples, the data storage utilized by the snapshot pipeline to store snapshot player profiles may be space efficient and fast to query. In such examples, the snapshot player profiles may be slow to update due to the priority placed on space efficiency. On the other hand, the update pipeline can rapidly merge player data received since the current snapshot player profile was generated with the current snapshot player profile while prioritizing rapid retrieval and calculation over storage space efficiency. Because the data received since the current snapshot was generated is relatively small compared to the size of the dataset utilized for generating the snapshot player profiles, this framework may reduce the latency at which up-to-date data is delivered to player profile consumers without excessive storage overhead.

Of course, embodiments are not limited to the specific examples given herein. For example, while some example player profile management systems illustrated herein output player profiles to player profile consumer(s), other examples output the player profiles to a player profile datastore which, for example, can be queried on demand by player profile consumer(s). In another example variation, the update pipeline also stores update player profiles at each iteration and uses the update player profiles in subsequent iterations of the update pipeline occurring before the next iteration of the snapshot pipeline. These and other examples variations would be apparent in view of this disclosure.

Certain implementations and embodiments of the disclosure will now be described more fully below with reference to the accompanying figures, in which various aspects are shown. However, the various aspects may be implemented in many different forms and should not be construed as limited to the implementations set forth herein. It will be appreciated that the disclosure encompasses variations of the embodiments, as described herein. Like numbers refer to like elements throughout.

FIG. 1 illustrates a schematic diagram of an example environment 100 with game system(s) 110, game client device(s) 120, gaming and related system(s) 130 that enable computer gaming and related services and a player profile management system 132 that may collect player data from various systems and generate and manage player profiles, in accordance with example embodiments of the disclosure.

The example environment 100 may include one or more player(s) 122(1), 122(2), 122(3), . . . 124(N), hereinafter referred to individually or collectively as player(s) 122, who may interact with respective game client device(s) 120(1), 120(2), 120(3), . . . 120(N), hereinafter referred to individually or collectively as game client device(s) 120 via respective input device(s).

The game client device(s) 120 may receive game state information from the one or more game system(s) 110 that may host the game played by the player(s) 122 of environment 100. The game state information may be received repeatedly and/or continuously and/or as events of the game transpire. The game state information may be based at least in part on the interactions that each of the player(s) 122 has in response to events of the game hosted by the game system(s) 110. Though discussed primarily herein in the form of an online game, embodiments are not so limited and may include single player or non-online gaming in which game state data is uploaded to the game system(s) 110 or gaming and related system(s) 130 for various operations but in which the other operations of the game system(s) 110 are provided by the game client device(s) 120.

The game client devices 120 may be configured to render content associated with the game to respective players 122 based at least on the game state information. More particularly, the game client device(s) 120 may use the most recent game state information to render current events of the game as content. This content may include video, audio, haptic, combinations thereof, or the like content components.

As events transpire in the game, the game system(s) 110 may update game state information and send that game state information to the game client device(s) 120. For example, if the players 122 are playing an online soccer game, and the player 122 playing one of the goalies moves in a particular direction, then that movement and/or goalie location may be represented in the game state information that may be sent to each of the game client device(s) 120 for rendering the event of the goalie moving in the particular direction. In this way, the content of the game is repeatedly updated throughout game play.

When the game client device(s) 120 receive the game state information from the game system(s) 110, a game client device 120 may render updated content associated with the game to its respective player 122. This updated content may embody events that may have transpired since the previous state of the game (e.g., the movement of the goalie).

The game client device(s) 120 may accept input from respective players 122 via respective input device(s). The input from the players 122 may be responsive to events in the game. For example, in an online basketball game, if a player 122 sees an event in the rendered content, such as an opposing team's guard blocking the point, the player 122 may use his/her input device to try to shoot a three-pointer. The intended action by the player 122, as captured via his/her input device, may be received by the game client device 120 and sent to the game system(s) 110.

The game client device(s) 120 may be any suitable device, including, but not limited to a Sony Playstation® line of systems, a Nintendo Switch® line of systems, a Microsoft Xbox® line of systems, any gaming device manufactured by Sony, Microsoft, Nintendo, or Sega, an Intel-Architecture (IA)® based system, an Apple Macintosh® system, a netbook computer, a notebook computer, a desktop computer system, a set-top box system, a handheld system, a smartphone, a personal digital assistant, combinations thereof, or the like. In general, the game client device(s) 120 may execute programs thereon to interact with the game system (s) 110 and render game content based at least in part on game state information received from the game system(s) 110. Additionally, the game client device(s) 120 may send indications of player input to the game system(s) 110. Game state information and player input information may be shared between the game client device(s) 120 and the game system(s) 110 using any suitable mechanism, such as application program interfaces (APIs).

The game system(s) 110 may receive inputs from various player(s) 122 and update the state of the online game based thereon. As the state of the online game is updated, the state may be sent to the game client device(s) 120 for rendering online game content to players 122. In this way, the game system(s) 110 may host the online game.

The example environment 100 may further include gaming and related system(s) 130 that may be configured to provide various services for the game system(s) 110, game client device(s) 120 and player(s) 122. The gaming and related system(s) 130 may be both data source(s) and player profile consumer(s) for the player profile management system 132. The example gaming and related system(s) 130 may include one or more of a gaming distribution platform, a matchmaking service, a dynamic content generation or personalization service and/or a simulated player service.

In examples in which the gaming and related system(s) 130 include a gaming distribution platform, the gaming distribution platform may provide a game catalog to players, manage game-related transactions (such as game or downloadable content purchase transactions), provide the player with a library of available and/or owned content, and/or perform user account maintenance tasks. Such a gaming distribution platform may utilize player profile information from the player profile management system 132 to personalize product recommendations and/or offers to players. For example, player profile information about previously purchased content, discounts or specials associated with previous purchases, play time in games or genres of games, and recent browsing history may be utilized to generate a personalized offer to a player for content the player is likely to be interested in with a discount or special which may be of interest to the player.

In examples in which the gaming and related system(s) 130 include matchmaking service(s), the matchmaking service(s) may provide matching of players for online games based at least in part on historical metrics associated with each of the players. Some example matchmaking factors may be related to behavior and may include playstyle, skill score, and so on. Some matchmaking factors may be character or setup related such as character class, team choice, position or role preference, and so on. The historical metrics may be included in player profiles provided by the player profile management system 132 or the matchmaking service may generate historical metrics based on player profiles provided by the player profile management system 132.

In examples in which the gaming and related system(s) 130 include a dynamic content generation or personalization service the A dynamic content generation or personalization service may utilize player profiles provided by the player profile management system 132 to provide player driven dynamic content such as dynamically generated in-game content. For example, a dynamic content generation or personalization service may receive a request associated with a particular player for specified dynamically generated in-game content such as a map, an enemy population, a loot drop, or so on. The dynamic content generation or personalization service may utilize player profile information in the generation of the dynamic content (e.g., as factors in decision making or as inputs to a machine learning algorithm that may generate dynamic content).

Similarly, in examples in which the gaming and related system(s) 130 include a simulated player service, the a simulated player service may utilize player profiles provided by the player profile management system 132 to generate simulated players which may be matched to human players desiring to play an online game, for example, when other suitable human players are not available for matching. For example, player profiles provided by the player profile management system may be include action data and/or situation data of the player during gameplay that may be input to a machine learning algorithm to train a simulated player based on the player associated with the player profile. Such a simulated player may perform similar actions during gameplay as the player upon which it is based.

During operation, the player profile management system 132 may continuously monitor and collect player data from a variety of sources (e.g., by actively requesting information, passively receiving data, a combination thereof, etc.). In the illustrated example of FIG. 1, the player profile management system 132 may collect player data from the game system(s) 110, the game client device(s) 120, and/or the gaming and related system(s) 130. The collected player data may in turn be utilized to generate player profiles (e.g., snapshot player profiles and/or update player profiles). In some examples, the player profiles may be output to player profile consumer(s) (e.g., the game system(s) 110, the game client device(s) 120, and/or the gaming and related system(s) 130) at each iteration of the pipelines of the player profile management system 132. In addition, or alternatively, the player profiles may be stored in a player datastore (not shown) that may be queried by player profile consumers.

Player data may include any number of attributes which may vary from implementation to implementation. The attributes may include the browsing history of the player, purchase information, the game state information of the player's interaction with games, match histories of the player, team histories of the player, and/or any other information about the player that may be collected. Further, implementations are not limited to collecting data from gaming systems and may collect and utilize information from external sources that may be utilized by the player profile consumers.

Additional operation of an example player profile management system 132 is discussed below with respect to FIG. 2.

Figure 2:
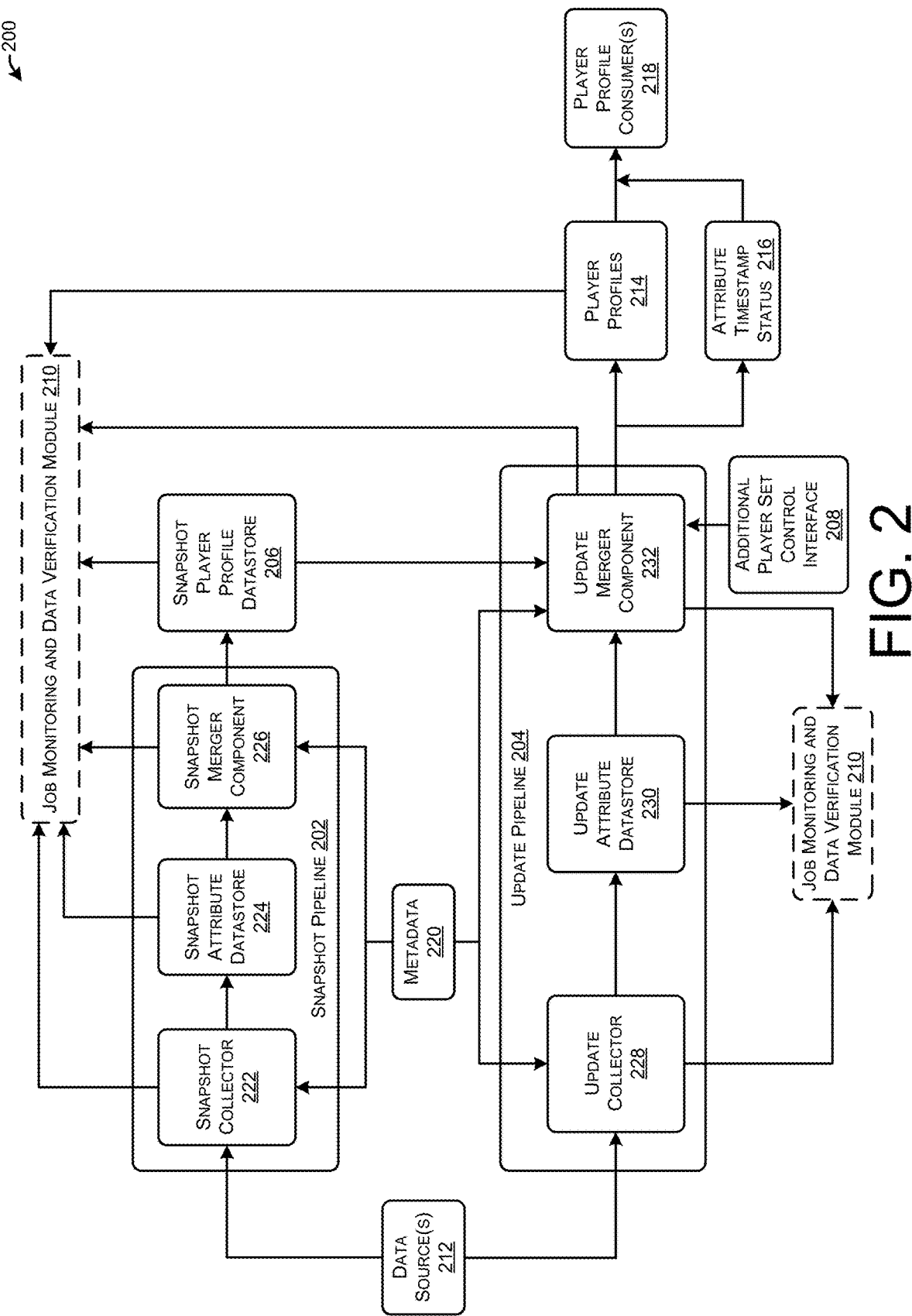
FIG. 2 illustrates a schematic diagram of an example player profile management system that may collect player data from various systems and generate and manage player profiles, in accordance with example embodiments of the disclosure.

FIG. 2 illustrates a schematic diagram of an example environment 200 including a player profile management system that may collect player data from various systems and generate and manage player profiles, in accordance with example embodiments of the disclosure. The example player profile management system may include a snapshot pipeline 202, an update pipeline 204, a snapshot player profile datastore 206, an additional player set control interface 208, and a job monitoring and data verification module 210. The snapshot pipeline 202 may include a snapshot collector 222, a snapshot attribute datastore 224 and a snapshot merger component 226. Similarly, the update pipeline 204 may include an update collector 228, an update attribute datastore 230 and an update merger component 232.

In operation, the snapshot pipeline 202 and the update pipeline 204 may receive player data from one or more data source(s) 212. As will be discussed in more detail below, the pipelines 202 and 204 may operate to output player profiles 214 and attribute timestamp status information 216 to player profile consumer(s) 218.

In some examples, the snapshot collector 222 may operate to actively or passively collect player data from the data source(s) 212 and store the player data in the snapshot attribute datastore 224. For example, the snapshot collector 222 may store player data based on an associated player identifier. The snapshot merger component 226 may operate to periodically construct snapshot player profiles for players based on the player data stored in the snapshot attribute datastore 224. The snapshot merger component 226 may store the constructed snapshot player profiles in the snapshot player profile datastore 206.

In some examples, the update collector 228 may operate to actively or passively collect player data from the data source(s) 212 and store the player data in the update attribute datastore 230. For example, the update collector 228 may store player data based on an associated player identifier. The update merger component 232 may operate to periodically construct update player profiles for players based on the player data stored in the update attribute datastore 230 and snapshot player profiles stored in the snapshot player profile datastore 206. The update merger component 232 may output the constructed update player profiles to the player profile consumer(s) 218 as player profiles 214. The update merger component 232 may also output attribute timestamp status information 216 regarding the update player profiles. For example, the attribute timestamp status information 216 may indicate which players or which attributes of the player profiles have been updated. For example, such attribute timestamp status information 216 may be utilized by player profile consumer(s) 218 to selectively consume the update player profiles and/or to selectively forego retrieval or requesting of the update player profiles.

In some examples, the player profiles 214 output by the update merger component 232 may include player profiles associated with players for which new data has been collected since the last iteration of the snapshot pipeline 202 (e.g., less than all the snapshot player profiles). Though not shown, in some examples, the snapshot merger component 226 may output snapshot player profiles to the player profile consumer(s) 218 or may cause the update merger component 232 to output the player profiles as discussed above. Further, depending on the implementation, the merger component(s) 226 and/or 232 may output the player profiles 214 and/or attribute timestamp status information 216 to a profile datastore (e.g., outside the player profile management system).

The update merger component 232 may operate at a relatively higher frequency than the snapshot merger component 226. More particularly, the update merger component 232 may operate between iterations of the snapshot merger component 226. In an example implementation, the snapshot merger component 226 may operate to generate snapshot player profiles once daily. On the other hand, the update merger component 232 may operate to generate update player profiles hourly in between the iterations of the snapshot merger component 226. Depending on the implementation, the update merger component 232 may skip the hour at which the snapshot merger component 226 operates or may operate to output the snapshot player profiles from the snapshot player profile datastore 206 to the player profile consumers once the snapshot merger component 226 completes construction of the snapshot player profiles.

Further, once the snapshot merger component 226 completes construction of the snapshot player profiles, the update attribute datastore 230 may be cleared (e.g., such that player data incorporated into the snapshot player profiles may be cleared from the update attribute datastore 230).

Depending on the implementation, the data collected by the collectors 222 and 228 may be raw data, processed data and/or semi-processed data. Further, the collectors 222 and 228 and/or merger components 226 and 232 may operate to perform various levels of processing of data during construction of the player profiles. For example, when a player plays a first person shooter game, the game system 110 may provide data relating to how long the player played the game in various forms, such as a raw data (e.g., a start and stop time of the player's game session), processed data (e.g., a duration), detailed processed data (e.g., duration, start time, time spent in each task, level or type of content within the game), or in some other form. Similarly, the collectors 222 and 228 and/or merger components 226 and 232 may receive one of the aforementioned forms of data and directly utilize or further process the received data for storage in the attribute datastores 224 and 230 or in the creation of the player profiles 214.

In some examples, the aforementioned operations of the collectors 222 and 228 and/or merger components 226 and 232 may be controlled and/or altered based on metadata 220. More particularly, the metadata may, in some examples, specify data source(s) 212 from which data is collected and/or processing, if any, that is performed before storage in the attribute datastores 224 and 230 and/or in the creation of the player profiles 214. By modifying the metadata 220, player data may be collected from existing or new data sources dynamically without affecting running jobs (e.g., via a metadata UI). In addition, the metadata may specify multiple-level filters to be applied to the data sources such that different player data attributes may appear for different games in the player profiles.

The job monitoring and data verification module 210 may operate to monitor and/or coordinate the operation of the pipelines 202 and 204. For example, the job monitoring and data verification module 210 may operate to cause the update collector 228 to trigger the clearing of the update attribute datastore 230 discussed above, for example, once the snapshot merger component 226 completes construction of the snapshot player profiles (e.g., such that player data incorporated into the snapshot player profiles may be cleared from the update attribute datastore 230).

The job monitoring and data verification module 210 may further operate to perform data verification operations that may, for example, detect and prevent corrupt or incorrect player profiles from being output to player profile consumer(s). The job monitoring and data verification module 210 may monitor the snapshot attribute datastore 224, snapshot player profile datastore 206, update attribute datastore 230 and player profiles 214 for data corruption (e.g., by checking the validity of updates among some portion of the player profiles 214 being output). In a particular example, the job monitoring and data verification module 210 may select an update player profile output by the update merger component for verification on a random or other audit basis. The job monitoring and data verification module 210 may perform a merger of the player data stored in the snapshot attribute datastore 224 in the same manner as performed by the snapshot merger component (e.g., without waiting for the next snapshot iteration). Alternatively, the job monitoring and data verification module 210 may verify the output of the update merger component 232 based on the current snapshot player profile and the player data stored in the update attribute datastore 230. The job monitoring and data verification module 210 may perform various operations in response to a failure. For example, the current snapshot player profile may be output instead of an invalid update player profile. Other example operations would be apparent in view of this disclosure. While shown as a single component, the job monitoring and data verification module 210 may be implemented as multiple components.

The additional player set control interface 208 may operate to, for example, control the output of player profiles 214. For example, the additional player set control interface 208 may be utilized to request the output of player profiles for which additional data has not been received since the latest snapshot player profile was created. For example, the additional player set control interface 208 may be utilized where a player profile consumer desires to receive player profiles for a certain player set without awaiting the next snapshot pipeline iteration.

Figure 3:
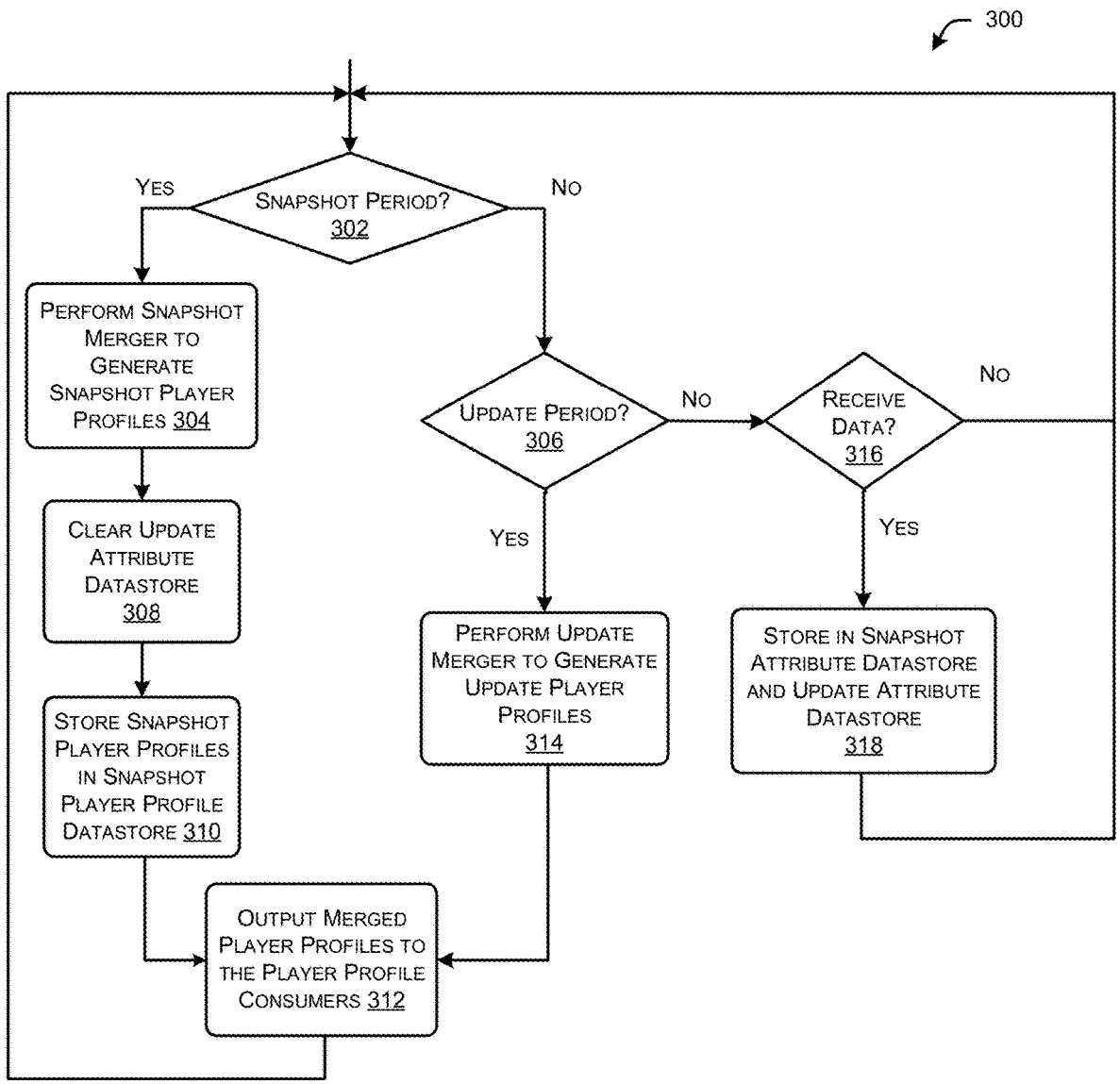
FIG. 3 illustrates a flow diagram of an example method to collect player data from various systems and generate and manage player profiles, in accordance with example embodiments of the disclosure.

FIG. 3 illustrates a flow diagram of an example method 300 to collect player data from various systems and generate and manage player profiles, in accordance with example embodiments of the disclosure. The method 300 may be performed by the player profile management system 132, individually or in cooperation with one or more other elements of the environment 100.

At block 302, the player profile management system 132 may determine whether a snapshot period has elapsed. If so, the process 300 may continue to block 304. Otherwise, the process 300 may continue to block 306. At block 304, the player profile management system 132 may operate perform a snapshot merger to generate snapshot player profiles. As discussed above, the snapshot merger component 226 may generate snapshot player profiles based on a merger of the player data stored in the snapshot attribute datastore 224. Then, at block 308, the player profile management system 132 may operate to clear the update attribute datastore 230 (e.g., such that player data incorporated into the snapshot player profiles may be cleared from the update attribute datastore 230). The process may then continue to block 310.

At block 310, the player profile management system 132 may store the snapshot player profiles in the snapshot player profile datastore 206. At block 312, the player profile management system 132 may output the merged player profiles to the player profile consumers. The process 300 may then return to block 302.

Returning to block 306, the player profile management system 132 may determine whether an update period has elapsed. If so, the process 300 may continue to block 314. Otherwise, the process 300 may continue to block 316. At block 314, the player profile management system 132 may operate perform an update merger to generate update player profiles. As discussed above, the update merger component 232 may generate update player profiles based on a merger of the player data stored in the update attribute datastore 230 with the current snapshot player profiles stored in the snapshot player profile datastore 206. The process may then continue to block 312 as discussed above.

Returning to block 316, the player profile management system 132 may determine whether player data has been received. If so, the process 300 may continue to block 318. Otherwise, the process 300 may return to block 302. At block 318, the player profile management system 132 may operate to store the received player data in the snapshot attribute datastore and the update attribute datastore. The process 300 may then return to block 302.

It should be noted that some of the operations of method 300 may be performed out of the order presented, with additional elements, and/or without some elements. Some of the operations of method 300 may further take place substantially concurrently and, therefore, may conclude in an order different from the order of operations shown above.

It should be understood that the original applicant herein determines which technologies to use and/or productize based on their usefulness and relevance in a constantly evolving field, and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

Figure 4:
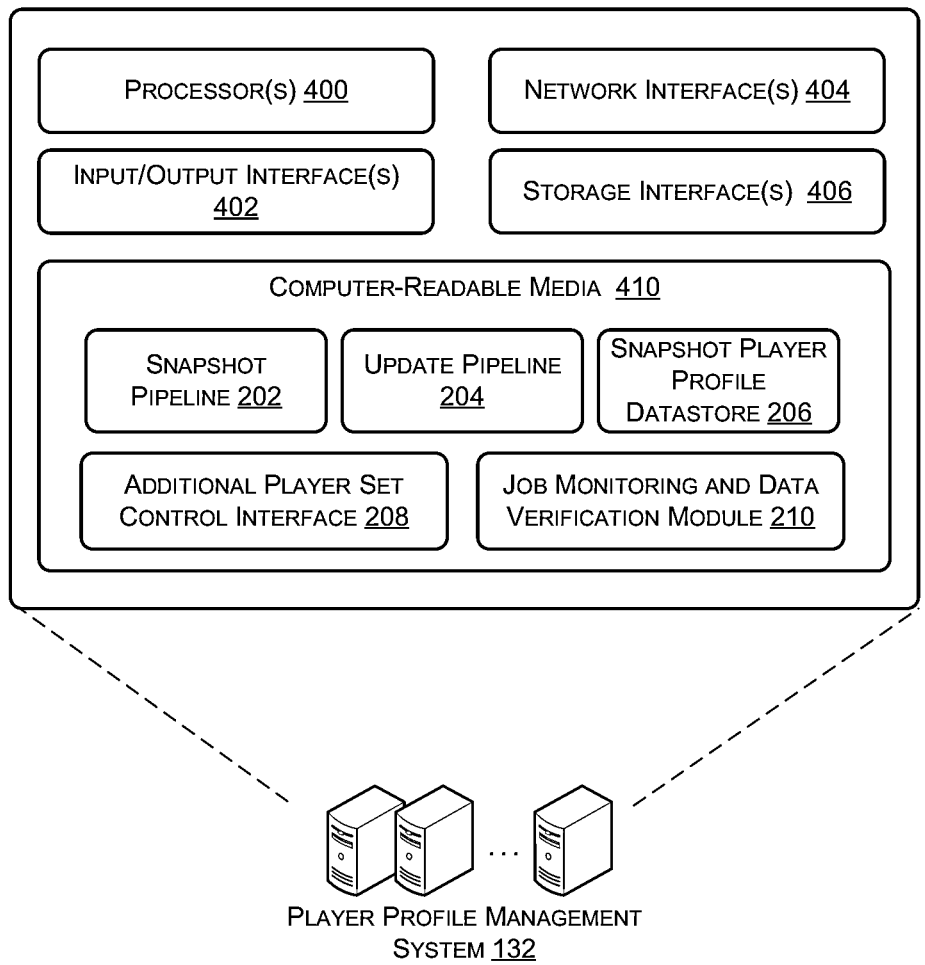
FIG. 4 illustrates a block diagram of an example player profile management system that may collect player data from various systems and generate and manage player profiles.

FIG. 4 illustrates a block diagram of an example player profile management system 132 that may collect player data from various systems and generate and manage player profiles, in accordance with example embodiments of the disclosure. The player profile management system 132 may include one or more processor(s) 400, one or more input/output (I/O) interface(s) 402, one or more network interface(s) 404, one or more storage interface(s) 406, and computer-readable media 410.

In some implementations, the processors(s) 400 may include a central processing unit (CPU), a graphics processing unit (GPU), both CPU and GPU, a microprocessor, a digital signal processor or other processing units or components known in the art. Alternatively, or in addition, the functionally described herein can be performed, at least in part, by one or more hardware logic components. For example, and without limitation, illustrative types of hardware logic components that may be used include field-programmable gate arrays (FPGAs), application-specific integrated circuits (ASICs), application-specific standard products (AS SPs), system-on-a-chip system(s) (SOCs), complex programmable logic devices (CPLDs), etc. Additionally, each of the processor(s) 400 may possess its own local memory, which also may store program modules, program data, and/or one or more operating system(s). The one or more processor(s) 400 may include one or more cores.

The one or more input/output (I/O) interface(s) 402 may enable player profile management system 132 to detect interaction with a user and/or other system(s), such as one or more game system(s) 110. The I/O interface(s) 402 may include a combination of hardware, software, and/or firmware and may include software drivers for enabling the operation of any variety of I/O device(s) integrated on the player profile management system 132 or with which the player profile management system 132 interact, such as displays, microphones, speakers, cameras, switches, and any other variety of sensors, or the like.

The network interface(s) 404 may enable the player profile management system 132 to communicate via the one or more network(s). The network interface(s) 404 may include a combination of hardware, software, and/or firmware and may include software drivers for enabling any variety of protocol-based communications, and any variety of wireline and/or wireless ports/antennas. For example, the network interface(s) 404 may comprise one or more of a cellular radio, a wireless (e.g., IEEE 802.1x-based) interface, a Bluetooth® interface, and the like. In some embodiments, the network interface(s) 404 may include radio frequency (RF) circuitry that allows the player profile management system 132 to transition between various standards. The network interface(s) 404 may further enable the player profile management system 132 to communicate over circuit-switch domains and/or packet-switch domains.

The storage interface(s) 406 may enable the processor(s) 400 to interface and exchange data with the computer-readable medium 410, as well as any storage device(s) external to the player profile management system 132, such as an external player profile datastore (e.g., in implementations in which the player profile management system 132 outputs the player profiles 214 to an external player profile datastore that may be queried by player profile consumers).

The computer-readable media 410 may include volatile and/or nonvolatile memory, removable and non-removable media implemented in any method or technology for storage of information, such as computer-readable instructions, data structures, program modules, or other data. Such memory includes, but is not limited to, random access memory (RAM), read-only memory (ROM), electrically erasable programmable read-only memory (EEPROM), flash memory or other memory technology, CD-ROM, digital versatile discs (DVD) or other optical storage, magnetic cassettes, magnetic tape, magnetic disk storage or other magnetic storage devices, RAID storage system(s), or any other medium which can be used to store the desired information and which can be accessed by a computing device. The computer-readable media 410 may be implemented as computer-readable storage media (CRSM), which may be any available physical media accessible by the processor(s) 400 to execute instructions stored on the computer readable media 410. In one basic implementation, CRSM may include RAM and Flash memory. In other implementations, CRSM may include, but is not limited to, ROM, EEPROM, or any other tangible medium which can be used to store the desired information and which can be accessed by the processor(s) 400. The computer-readable media 410 may have an operating system (OS) and/or a variety of suitable applications stored thereon. The OS, when executed by the processor(s) 400 may enable management of hardware and/or software resources of the player profile management system 132.

Several functional blocks having instruction, data stores, and so forth may be stored within the computer-readable media 410 and configured to execute on the processor(s) 400. The computer readable media 410 may have stored thereon the snapshot pipeline 202, update pipeline 204, snapshot player profile datastore 206, additional player set control interface 208 and job monitoring and data verification module 210. It will be appreciated that each of the functional blocks 202-210 may have instructions stored thereon that when executed by the processor(s) 400 may enable various functions pertaining to the operations of the player profile management system 132 discussed above with respect to FIGS. 1-3.

The illustrated aspects of the claimed subject matter may also be practiced in distributed computing environments where certain tasks are performed by remote processing devices that are linked through a communications network. In a distributed computing environment, program modules can be located in both local and remote memory storage devices.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

The disclosure is described above with reference to block and flow diagrams of system(s), methods, apparatuses, and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

Computer-executable program instructions may be loaded onto a general purpose computer, a special-purpose computer, a processor, or other programmable data processing apparatus to produce a particular machine, such that the instructions that execute on the computer, processor, or other programmable data processing apparatus for implementing one or more functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction that implement one or more functions specified in the flow diagram block or blocks. As an example, embodiments of the disclosure may provide for a computer program product, comprising a computer usable medium having a computer readable program code or program instructions embodied therein, said computer readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

It will be appreciated that each of the memories and data storage devices described herein can store data and information for subsequent retrieval. The memories and datastores can be in communication with each other and/or other datastores, such as a centralized datastore, or other types of data storage devices. When needed, data or information stored in a memory or datastore may be transmitted to a centralized datastore capable of receiving data, information, or data records from more than one datastore or other data storage devices. In other embodiments, the datastores shown can be integrated or distributed into any number of datastores or other data storage devices.

Many modifications and other embodiments of the disclosure set forth herein will be apparent having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system, comprising:
one or more processors; and
one or more computer-readable media storing computer-executable instructions that, when executed by the one or more processors, cause the one or more processors to perform operations comprising:
receiving first player data associated with a player;
storing the first player data in an update attribute datastore of an update pipeline;
generating, by a snapshot pipeline of a player profile management system and based on the first player data, a snapshot player profile associated with the player;
clearing, after generating the snapshot player profile, the first player data from the update attribute datastore of the update pipeline;
receiving, by the player profile management system and after generating the snapshot player profile associated with the player, second player data associated with the player; and
generating, by the update pipeline of the player profile management system and based on the snapshot player profile and the second player data associated with the player, an update player profile associated with the player.

2. The system of claim 1, wherein:
the snapshot pipeline includes a snapshot attribute datastore;
and
the operations further comprise:
storing, by the player profile management system and in response to receiving the second player data, the second player data in the snapshot attribute datastore and the update attribute datastore.

3. The system of claim 2, wherein generating the update player profile utilizes the second player data stored in the update attribute datastore.

4. The system of claim 3, wherein the snapshot player profile is a first snapshot player profile, the operations further comprising:
   receiving, by the player profile management system after generating the update player profile associated with the player, additional player data associated with the player;
   storing, by the player profile management system and in response to receiving the additional player data, the additional player data in the snapshot attribute datastore and the update attribute datastore; and
   generating, by the snapshot pipeline of the player profile management system, a second snapshot player profile associated with the player based at least in part on the second player data stored in the snapshot attribute datastore and the additional player data stored in the snapshot attribute datastore.

5. The system of claim 4, the operations further comprising:
   clearing, in response to generating the second snapshot player profile, the second player data stored in the update attribute datastore and the additional player data stored in the update attribute datastore.

6. The system of claim 1, the operations further comprising:
   storing, at least partly in response to generating the snapshot player profile, the snapshot player profile in a snapshot profile datastore of the player profile management system, wherein generating the update player profile associated with the player includes retrieving, by the update pipeline, the snapshot player profile from the snapshot profile datastore.

7. The system of claim 1, wherein receiving the first player data comprises receiving the first player data from multiple data sources.

8. A computer-implemented method, comprising:
   receiving first player data associated with a player;
   storing the first player data in an update attribute datastore of an update pipeline;
   generating, by a snapshot pipeline of a player profile management system and based on the first player data, a snapshot player profile associated with the player;
   clearing, after generating the snapshot player profile, the first player data from the update attribute datastore of the update pipeline;
   receiving, by the player profile management system and after generating the snapshot player profile associated with the player, second player data associated with the player; and
   generating, by the update pipeline of the player profile management system and based on the snapshot player profile and the second player data associated with the player, an update player profile associated with the player.

9. The computer-implemented method of claim 8, wherein:
   the snapshot pipeline includes a snapshot attribute datastore; and
   the computer-implemented method further comprising:
   storing, by the player profile management system and in response to receiving the second player data, the second player data in the snapshot attribute datastore and the update attribute datastore.

10. The computer-implemented method of claim 9, wherein generating the update player profile utilizes the second player data stored in the update attribute datastore.

11. The computer-implemented method of claim 10, wherein the snapshot player profile is a first snapshot player profile, further comprising receiving, by the player profile management system after generating the update player profile associated with the player, additional player data associated with the player;
   storing, by the player profile management system and in response to receiving the additional player data, the additional player data in the snapshot attribute datastore and the update attribute datastore; and
   generating, by the snapshot pipeline of the player profile management system, a second snapshot player profile associated with the player based at least in part on the second player data stored in the snapshot attribute datastore and the additional player data stored in the snapshot attribute datastore.

12. The computer-implemented method of claim 11, further comprising:
   clearing, in response to generating the second snapshot player profile, the second player data stored in the update attribute datastore and the additional player data stored in the update attribute datastore.

13. The computer-implemented method of claim 8, further comprising:
   storing, at least partly in response to generating the snapshot player profile, the snapshot player profile in a snapshot profile datastore of the player profile management system, wherein generating the update player profile associated with the player includes retrieving, by the update pipeline, the snapshot player profile from the snapshot profile datastore.

14. The computer-implemented method of claim 8, wherein receiving the first player data comprises receiving the first player data from multiple data sources.

15. One or more non-transitory computer-readable media storing computer-executable instructions that, when executed by one or more processors, cause the one or more processors to perform operations comprising:
   receiving first player data associated with a player;
   storing the first player data in an update attribute datastore of an update pipeline;
   generating, by a snapshot pipeline of a player profile management system and based on the first player data, a snapshot player profile associated with the player;
   clearing, after generating the snapshot player profile, the first player data from the update attribute datastore of the update pipeline;
   receiving, by the player profile management system and after generating the snapshot player profile associated with the player, second player data associated with the player; and
   generating, by the update pipeline of the player profile management system and based on the snapshot player profile and the second player data associated with the player, an update player profile associated with the player.

16. The one or more non-transitory computer-readable media of claim 15, wherein:
   the snapshot pipeline includes a snapshot attribute datastore; and
   the operations further comprising:

storing, by the player profile management system and in response to receiving the second player data, the second player data in the snapshot attribute datastore and the update attribute datastore.

17. The one or more non-transitory computer-readable media of claim 16, wherein generating the update player profile utilizes the second player data stored in the update attribute datastore and the operations further comprise:
receiving, by the player profile management system after generating the update player profile associated with the player, additional player data associated with the player;
storing, by the player profile management system and in response to receiving the additional player data, the additional player data in the snapshot attribute datastore and the update attribute datastore; and
generating, by the snapshot pipeline of the player profile management system, a second snapshot player profile associated with the player based at least in part on the second player data stored in the snapshot attribute datastore and the additional player data stored in the snapshot attribute datastore.

18. The one or more non-transitory computer-readable media of claim 17, wherein:
clearing, in response to generating the second snapshot player profile, the second player data stored in the update attribute datastore and the additional player data stored in the update attribute datastore.

19. The one or more non-transitory computer-readable media of claim 15, the operations further comprising:
storing, at least partly in response to generating the snapshot player profile, the snapshot player profile in a snapshot profile datastore of the player profile management system, wherein generating the update player profile associated with the player includes retrieving, by the update pipeline, the snapshot player profile from the snapshot profile datastore.

20. The one or more non-transitory computer-readable media of claim 15, wherein receiving the first player data comprises receiving the first player data from multiple data sources.

* * * * *